United States Patent [19]
Griffin et al.

[11] 4,279,123
[45] Jul. 21, 1981

[54] EXTERNAL GAS TURBINE ENGINE COOLING FOR CLEARANCE CONTROL

[75] Inventors: James G. Griffin, West Hartford; Frederick M. Schwarz, Glastonbury, both of Conn.

[73] Assignee: United Technologies Corporation, Hatford, Conn.

[21] Appl. No.: 971,288

[22] Filed: Dec. 20, 1978

[51] Int. Cl.³ .................................................. F02C 7/18
[52] U.S. Cl. .................................. 60/226 R; 60/39.66; 60/266; 415/136; 415/139
[58] Field of Search ...................... 60/266, 39.66, 226; 415/180, 127, 128, 136, 137, 138, 139

[56] References Cited

U.S. PATENT DOCUMENTS

| | | | |
|---|---|---|---|
| 3,777,484 | 12/1973 | Dibelins | 60/39.66 |
| 3,957,391 | 5/1976 | Vollinger | 415/136 |
| 3,992,126 | 11/1976 | Brown et al. | 415/136 |
| 4,013,376 | 3/1977 | Bisson et al. | 415/139 |
| 4,019,320 | 5/1977 | Redinger et al. | 60/226 |

Primary Examiner—Carlton R. Croyle
Assistant Examiner—Rae Cronmiller
Attorney, Agent, or Firm—Norman Friedland

[57] ABSTRACT

An active clearance control (ACC) for a turbofan engine is disclosed herein where the cross section of the external spray bars are fabricated in square or substantially square configurations.

4 Claims, 2 Drawing Figures

EXTERNAL GAS TURBINE ENGINE COOLING FOR CLEARANCE CONTROL

CROSS REFERENCE TO RELATED APPLICATION

This invention is utilized with an outer air seal support system that is described and claimed in a co-pending patent application entitled OUTER AIR SEAL SUPPORT STRUCTURE, filed by G. Chaplin, F. DeTolla and J. Griffin on even date and assigned to the same assignee as this patent application.

BACKGROUND OF THE INVENTION

This invention relates to active clearance controls for a turbofan engine and particularly to the spray-bar configuration.

U.S. Pat. No. 4,019,320 granted on Apr. 26, 1977 to I. H. Redinger, D. Sadowsky and P. S. Stripinis, and assigned to the same assignee as this patent application discloses and claims spray bars that are externally and circumferentially mounted around the casing of the engine. Air bled from the fan through a manifold feeds these spray bars which in turn judiciously squirts air on the case to control its expansion and contraction. The purpose being is to position the outer air seals relative to the tips of the rotating engine machinery so as to control the gap therebetween. Obviously, the gap should be maintained at a minimum at all modes of engine operation for the entire flight envelope since the gap is a leakage path that adversely affects the efficiency of the rotating machinery, which in turn is reflected in loss of fuel economy. Of course, it is abundantly important to achieve optimum thrust specific fuel consumption. This patent, supra, discloses a spray bar (that is circular in cross section) with discretely located air holes. To satisfy certain ACC applications, it becomes necessary to increase the diameter of the tube which necessitates the tube to be spaced further from the engine case with a consequential loss in cooling effectiveness.

Further the circular cross section does not lend itself to create an optimum film of cooling air between it and the case and hence doesn't take full advantage of the further cooling obtainable from the spent air from the cooling jets that would otherwise scrub the case.

These square pipes not only allow for the more effective distribution of cooling air but also provide a more compact assembly while increasing cooling flow capacity. Thus it is contemplated by this invention that the cooling air is utilized as effectively and efficiently as possible, thereby only utilizing the amount of cooling air necessary to accomplish optimum ACC. This assures that the energy extracted from the engine for ACC purposes does not unduly penalize engine performances which is a consequence of extracting cooling air. Amongst the advantages afforded by the employment of this invention, but not limited thereto are:

(1) the distance between the pipe and the engine case being controlled say, the turbine case, is optimized which places the pipe at 6 to 10 hole diameters from the surface to be cooled;

(2) the spent air lies closer to the engine case surface which scrubs the case which results in better cooling;

(3) cooling air holes can be drilled at locations that allow the cooling jets to strike more responsive points of the engine case; and (4) the overall spray bar configuration is more compact for the amount of flow capacity they encompass because they follow the engine case contour more effectively.

SUMMARY OF THE INVENTION

A feature of this invention is to provide for a turbofan engine improved active clearance control. The cross section of the spray bars externally circumscribing the engine case are square, rectangular or substantially those geometries.

Other features and advantages will be apparent from the specification and claims and from the accompanying drawings which illustrate an embodiment of the invention.

DESCRIPTION OF THE PREFERRED EMBODIMENT

Figure 1:
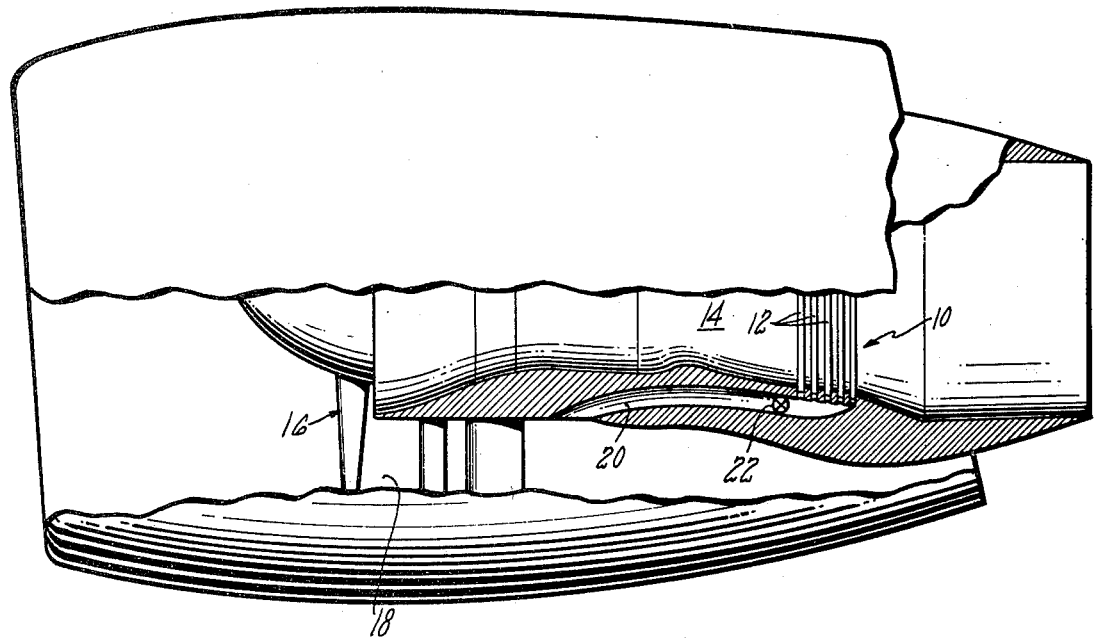
FIG. 1 is a schematic view partly in elevation and partly in section illustrating the invention.

This invention is currently being utilized on the JT9D-59, 70 and 7Q engine models manufactured by Pratt and Whitney Aircraft Manufacturing Group, a Division of United Technologies Corporation, the assignee, and for further details reference should be made thereto. For the purpose of this description the terms, square, rectangular, or similar shaped cross sections, refer to the spray bar and that it should be understood that the term as used herein encompases all shapes so long as the wall adjacent the engine case is substantially flat and its attached side wall is generally perpendicular thereto and generally parallel to the adjacent flange of the engine case.

Similar to the ACC described in the U.S. Pat. No. 4,019,320 patent, supra, the ACC generally indicated by reference numeral 10 comprises a plurality of spray bars 12 wrapped around the engine case 14 at a strategic location. Air discharging from the fan 16 of the turbofan engine in the annular duct 18 is bled through the passageway 20, collected in a manifold (not shown) and distributed to the spray bars 12. A suitable valve 22 is incorporated to feed the air to the spray bars in an operational mode described in U.S. Pat. No. 4,019,320 and reference should be made thereto for further details. Suffice it to say that typically the valve turns on the air at a predetermined mode in the flight envelope, say cruise, at which time there is a transient of growth of the metal components at different rates that tend to cause the gap between the outer air seal and tips of the rotor blades, say turbine, to increase. The purpose of the ACC, of course, is to prevent, or minimize this gap.

Figure 2:
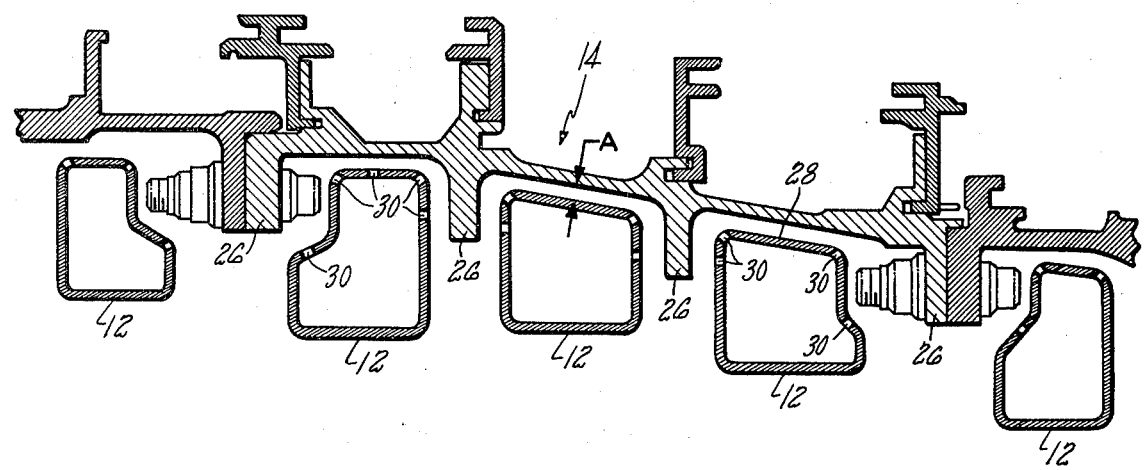
FIG. 2 is a partial view in section showing a portion of the engine case, the outer seal support structure and the spray bar.

In the enlarged view of FIG. 2 it can be seen that the square pipes 12, each being slightly configured differently although such is not necessary and geometrically shaped squares or rectangles are within the scope of this invention, are fitted between the flanges 26 of engine case 14 and the contour of wall 28 is substantially parallel to the outer wall of casing 14 as viewed in the plane of the sheet of the drawing and is secured therein to define a predetermined gap A. This gap is selected to achieve optimum heat transfer from the impingement and film of cooling air supported therebetween. The film of cooling air is formed from the spent air egressed from the spray bars, scrubbing the case and enhancing the cooling effectiveness. The apertures 30 in the tubes are discretely located in order to maximize the heat transfer effect effectuated by impingement cooling and, where possible are sized in relationship to the pipe so that the pipe is at 6 to 10 aperture diameters from the surface to be cooled. Of course at certain locations this may not be possible to achieve, but the use of the flat-like wall 28 of the spray bar attains a higher number of impingement cooling holes than could be otherwise attained.

As is apparent from the foregoing, the square pipes at the bolted flanges spray air effectively behind the bolts, which is an improvement over other spray bar configurations because the bolts partially block the jets from the turbine case surface. The striking distance of the jets are located at an optimum, particularly in the middle pipes running only 0.150 inches from the case. The square tubes do not take up as much room as the other heretofore known systems even though they have three times the flow capacity.

It should be understood that the invention is not limited to the particular embodiments shown and described herein, but that various changes and modifications may be made without departing from the spirit and scope of this novel concept as defined by the following claims.

We claim:

1. A turbofan engine operating over a range of power having a fan discharge duct, and having rotating machinery and a casing surrounding said rotating machinery, and where there are seal means extending inwardly from said casing, means for controlling the clearance between the tip of the rotating machinery and the seal means, said casing having a plurality of axially spaced flanges extending outwardly therefrom, at least one tube circumferentially mounted about said engine case adjacent to at least one of said flanges having a wall adjacent to said casing that is substantially coextensive with the expance between adjacent flanges and conforming to the shape of the casing, connection means interconnecting the fan discharge duct and said tube whereby the cool fan discharge air is directed through apertures formed in said tube to impinge on the side wall of said flange and said flange being sufficiently structured so that the effect of cooling causes the engine case to shrink to reduce the diameter of the seal means and the clearance between the said tip and said seal means, means for selectively turning the flow of air on and off at a given power condition of said range of power, and said wall of said tube being spaced from said casing and spanning substantially the distance between adjacent flanges defining a cavity for supporting a film of air supplied by the impinged air.

2. A turbofan engine as in claim 1 wherein said rotating mechanism is the turbine and said casing is the casing surrounding said turbine.

3. A turbofan engine as in claim 1 wherein the space between said wall and the casing is between 6 to 10 aperture diameters.

4. A turbofan engine as in claim 1 wherein said tube is substantially rectangular in cross section.

* * * * *